INVENTORS:
ROBERT DENNIS WALTER
WILLIAM FREDERICK PITCHER
BY Kurt Kelman
AGENT

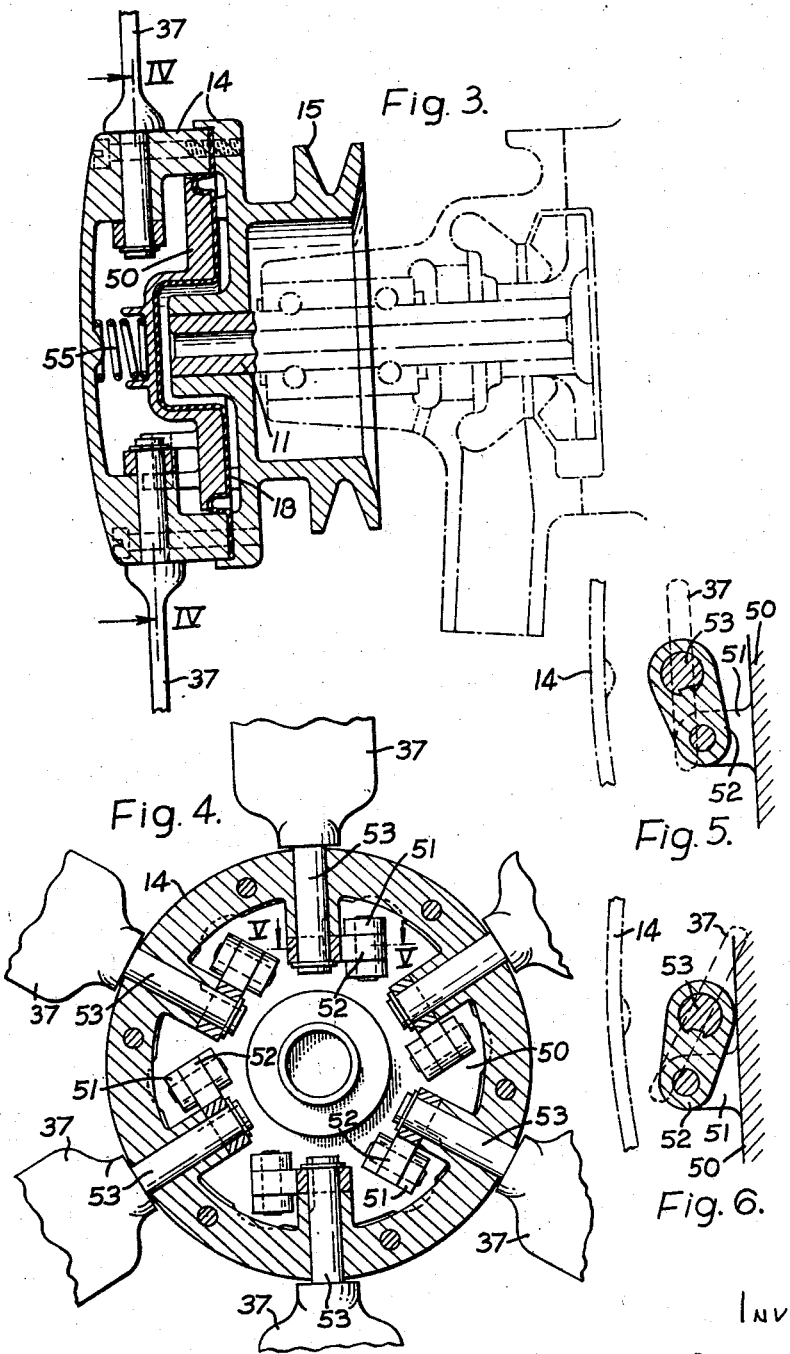

United States Patent Office 3,505,982
Patented Apr. 14, 1970

3,505,982
COOLING SYSTEMS FOR INTERNAL COMBUSTION ENGINES
Robert Dennis Walter, Coventry, and William Frederick Pitcher, Birmingham, England, assignors to Concentric Pump Limited, Birmingham, England, a British company
Filed Jan. 23, 1968, Ser. No. 699,901
Claims priority, application Great Britain, Feb. 16, 1967, 7,395/67
Int. Cl. F01p 7/06, 7/08
U.S. Cl. 123—41.12
4 Claims

ABSTRACT OF THE DISCLOSURE

The invention provides apparatus for rendering the fan in an engine cooling system inoperative upon fall in coolant pressure and hence temperature below a predetermined value, by arranging a diaphragm for the water to operate on, and linkages or clutch means to operate the fan blades.

---

This invention relates to cooling systems for internal combustion engines. It is well known that the conventional cooling system for automatic internal combustion engines, using a heat exchanger or radiator through which the coolant is circulated and a fan to induce a draught of air through the heat exchanger matrix, is wasteful in power and hence in fuel for two reasons; first because the fan drive absorbs a percentage of the engine power output and unless the engine is at or near its operating temperature the fan unnecessary and hence the power utilised is wasted, and second because use of the fan before the engine has reached its operating temperature delays the time at which the engine reaches design temperature, and usually efficiency is highest at the design temperature of the engine.

It is therefore known to provide means for disconnecting the fan until such time as the engine temperature warrants its use. Various methods of disconnecting the fan have been proposed, but in practice they are usually rather expensive.

The object of the present invention is to provide particularly simple and inexpensive means for connecting and disconnecting the fan.

In accordance with the present invention the fan drive in an internal combustion engine installation including a pressurised coolat system is via a mechanism having a member displaceable in one direction by coolant to render the fan effective and returnable in the opposite direction to render the fan ineffective, said member being exposed to and movable by pressure variations in the pressurised coolant system.

Hence, in accordance with the present invention, the fan is effectively disconnected or may be rendered ineffective by varying the pitch of the blades.

Figure 1:
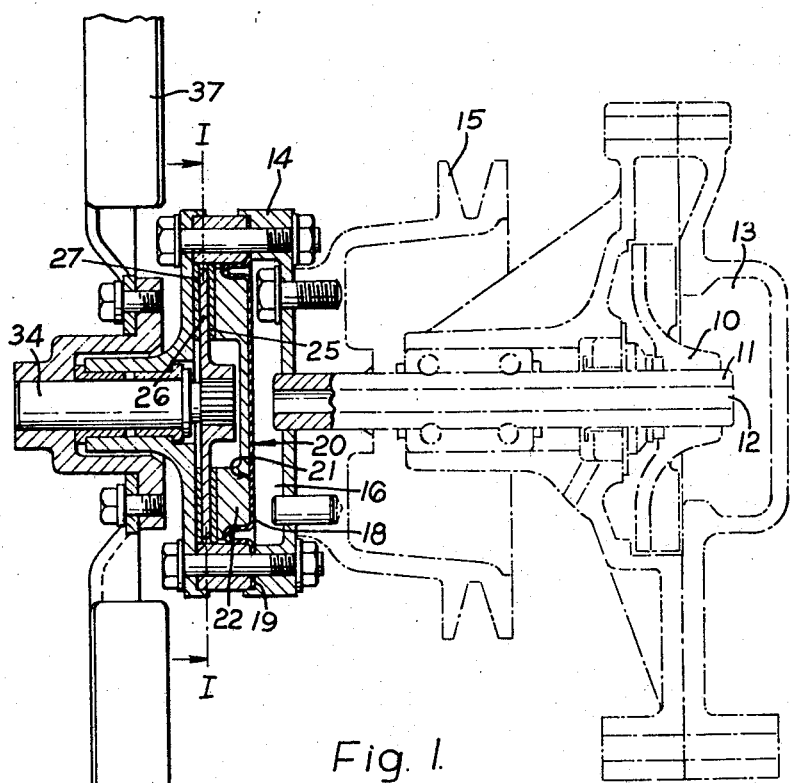
Figure 2:
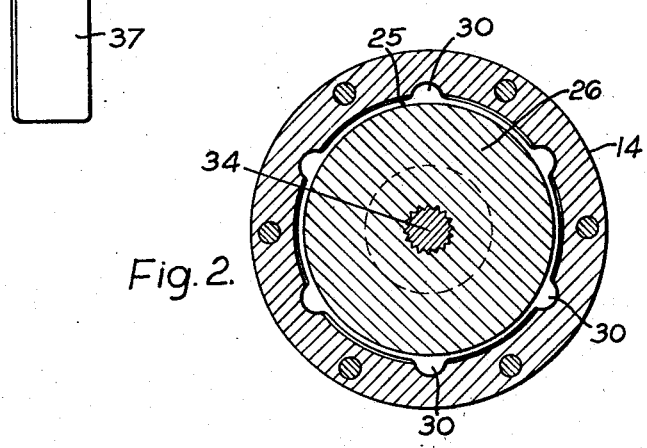

Two embodiments of the invention are now more particularly described by way of illustration with reference to the accompanying drawings wherein:

FIGURE 1 is a sectional elevation of one embodiment; and
FIGURE 2 is a section on the line I—I thereof;
FIGURE 3 is similar to FIGURE 1 but of a second embodiment;
FIGURE 4 is a section on the line IV—IV of FIGURE 3; and
FIGURES 5 and 6 are views on the line V—V of FIGURE 4 showing alternate positions of parts.

Referring now to the drawings and particularly FIGURES 1 and 2 thereof, the water pump impeller 10 is fast with the spindle 11 which is bored axially from end to end at 12, the one end being open in the impeller chamber 13 and at the other end opening to the housing 14 which is attached to the pulley 15 and which forms the bearing for the fan spindle. The pulley, housing and impeller are all conventional, except for the bore 12.

The coolant system (not otherwise shown) is pressurised, so that during rise in temperature of the collant water or other liquid the pressure in the system also increases proportionately, and the interior of the housing 14 at 16 is therefore exposed to pressure variations, and one wall of the housing is a flexible or rolling diaphragm 18 sealed about its periphery 19 and having one face 20 exposed to the coolant and the other face 21 abutting a pressure annulus 22 which forms an intermediate member. The latter abuts a first of a series of three plates 25–27 although the diaphragm could in a nonillustrated modification contact the plates direct.

The diaphragm may be sufficiently resilient to return to a neutral position in which the three plates are spaced one with another and the housing wall respectively so that drive is not transmitted, or possibly the diaphragm may be merely flexible, in which case reduction of pressure in the coolant system will have the same effect of withdrawing the diaphragm from the plates.

Plates 25 and 27 have peripheral lobes 30 which engage in splines in the housing 14 to clutch these plates thereto, but are loose on the fan drive spindle 34. Between plates 25 and 27 is plate 26 which is loose in the housing and splined to the spindle 33 at its hub. The fan blades 37 are fast with the spindle 34.

It will be appreciated that the fan blades 37 will only be clutched so as to be driven when the water temperature and hence pressure rises above a predetermined minimum so as to clamp the three plates together and the arrangement will be such that said minimum is slightly below the designed operating temperature of the engine. If the temperature and hence pressure drop for any reason, for example due to the engine being temporarily stopped or due to the temperature or flow rate of the air flowing through the heat exchanger matrix being such as to exert an extra cooling effect on the coolant which is carried to the heat exchanger by the running of the engine, the fan drive will again be disconnected until such time as the pressure again rises to the predetermined minimum.

Referring now to FIGURES 3 to 6, the arrangement of water impeller, hollow spindle supporting the impeller, and bore for the spindle are generally similar to those described with reference to FIGURES 1 and 2 and again the hollow spindle 11 projects into and is fast with a housing assembly 14 formed or provided with a belt pulley 15 by means of which the drive is transferred from the engine to the impeller and to the fan.

Again, similarly to the arrangement previously described, water pressure is admitted via the hollow spindle to the interior of the housing to act upon a flexible rolling diaphragm 18.

However instead of the diaphragm being used to transmit drive pressure to a clutch plate, the diaphragm in this invention acts on a plate 50 carrying a set of lugs 51 each of which is linked at 52 to one of the fan blade spigot mountings 53, the latter being rotatable or angularly adjustable about individual axes radially of the housing and normal to the spindle axis, so that during movement of the diaphragm from one extreme position to an opposite extreme position the linkages turn the respective fan blades from a full feathered position to a full pitch position, that is from a position in which all of the fan blades successively lie in a common plane to a position in which the fan blades are at a substantial angle to the said common plane. For convenience in manufacture, member 50 is splined to the housing.

Each spigot is pinned or keyed at its end remote from the spigot to the corresponding link.

A helical compression spring 55 is provided between a closure for the housing and the drive plate or annulus so as to tend to return the latter to a position in which the blades are feathered. Hence when the coolant system is at minimum pressure and the engine is cool, the blades are spring urged into the feathered position so that the fan is ineffective to draw cooling air through the radiator matrix; as the engine heats up and the coolant system becomes pressurized and the diaphragm is displaced against the spring to turn the fan blades. Consequently the position of the fan blades is directly proportional to the coolant pressure.

We claim:

1. A fan drive for an internal combustion engine which includes a liquid coolant system, comprising a housing, a driving pulley fast with said housing, a hollow impeller spindle also fast with the housing, a liquid coolant impeller located in an impeller chamber and fast with said spindle, a fan comprising a set of fan blades and mounted on said housing, and a flexible diaphragm located in said housing and dividing the interior thereof into two mutually isolated parts, said diaphragm having one face thereof exposed in one of said housing parts to coolant communicated through the hollow impeller spindle and being arranged for displacement to transmit drive to the fan blades and render the same effective in rotation; characterized in that said housing is in communication with coolant only in said one of its parts, and said hollow impeller spindle opens into the impeller chamber for communication through the spindle of liquid coolant at the pressure and temperature obtaining in said chamber.

2. The fan drive as defined in claim 1 which is further characterized in that said housing comprises two complemental sections having the periphery of said diaphragm located therebetween, said diaphragm being a rolling diaphragm, and a plate is located in the other housing part on the face of the diaphragm opposite to that which is exposed to coolant, said plate transmitting drive to the fan blades.

3. The fan drive as defined in claim 2 which is further characterized in that said housing part containing said plate is internally axially splined and contains a series of further plates alternate ones of which are rotationally fast with the splined housing part and at least one other of which is rotationally free of the splined housing part and is fast with a spindle driving said fan.

4. The fan drive as defined in claim 1 which is further characterized in that said set of fan blades are journalled in radial bores in said housing and each blade carries within the housing a drive link connected to said diaphragm for angular turning of the blades upon diaphragm displacement.

References Cited

UNITED STATES PATENTS

| 2,452,264 | 10/1948 | Russell | 123—41.46 X |
| 2,661,148 | 12/1953 | Englander | 123—41.12 X |
| 3,106,343 | 10/1963 | Holland | 236—35 |
| 3,228,382 | 1/1966 | Stefan | 123—41.12 |

AL LAWRENCE SMITH, Primary Examiner

U.S. Cl. X.R.

123—41.46; 170—135.75; 236—35